Figure 1:
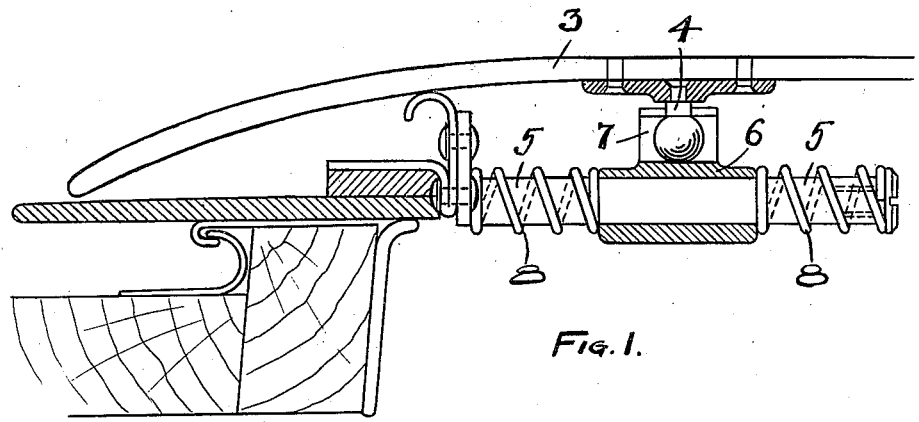

July 19, 1938. C. H. NICHOLS 2,124,117
FASTENER OR LATCH FOR VEHICLE ROOFS
Filed Nov. 16, 1936

Inventor.
C. H. NICHOLS.
per
Norman S. Barlow.
Attorney.

Patented July 19, 1938

2,124,117

UNITED STATES PATENT OFFICE 2,124,117

FASTENER OR LATCH FOR VEHICLE ROOFS

Charles Hillyard Nichols, West Bromwich, England, assignor of one-half to Alfred Wickham, West Bromwich, England Application November 16, 1936, Serial No. 111,172
In Great Britain March 30, 1936

1 Claim. (Cl. 292—164)

This invention comprises improvements connected with the roofs of motor cars, motor coaches or like vehicles and refers to that type in which the roof or section of the roof becomes automatically detached in the event of the car, coach or the like vehicle turning onto its side in an accident. The object of the present invention is to provide a simple and efficient arrangement for detachably securing the roof or section of said roof to the body of the vehicle, whilst on the vehicle turning onto its side in the event of an accident, the roof or section of same becomes automatically detached, thereby permitting the occupants to escape through the aperture in the roof.

Referring to the drawing:—

Figure 2:
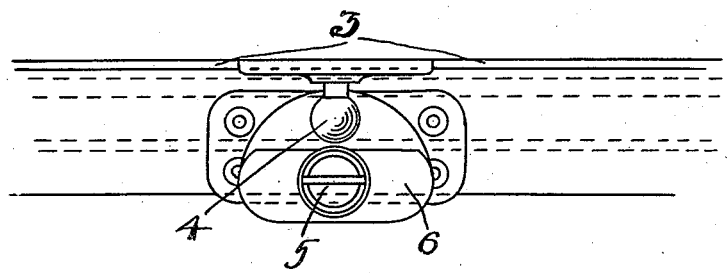

Figure 1 is a section of part of a detachable roof, showing the means according to this invention for securing the detachable roof in position on the vehicle body, whilst, Figure 2 is an end elevation.

Referring to the drawing, the detachable roof or panel 3 is provided on opposite sides with one or more members 4 having spherically shaped heads, whilst slidably mounted on a rod 5 which is secured to the body of the vehicle is a weighted catch member 6.

The catch member 6 is provided in its upper part with an undercut groove 7, so as to be capable of engagement with the spherically headed member 4 secured to the underside of the detachable roof or panel 3, so that when the vehicle is in its normal position as shown in the drawing, the slidably weighted catch member 6 retains the detachable roof or panel 3 in position as shown in the drawing.

Mounted on the rod 5 on both sides of the slidably mounted catch member 6 are compression springs 8 or other suitable means for retaining said catch member 6 in engagement with the member 4 secured to the detachable roof or panel 3.

The slidably mounted catch member 4 is so arranged that it is capable of sliding either side of the spherically headed member 4, so that whichever side the vehicle may be turned onto in the event of an accident, the slidable catch member 4 would move out of engagement with the spherically headed member 6 mounted on the detachable roof or panel 3 and allow same to fall free, thus allowing the occupants of the vehicle to get out.

The headed rod 5 may be adapted to extend across the roof of the vehicle and two slidable catch members 6 may be mounted thereon, one for each side of the detachable roof or panel.

I claim:—

A fastener or latch for detachable roofs or panels for vehicles, comprising in combination a headed member adapted to be attached to a roof or panel, a support member for mounting on a vehicle body, a weighted catch member slidably mounted on said support member, an undercut groove formed in the weighted catch member which is adapted to engage the headed member attached to a roof or panel to retain said roof or panel in position and resilient members mounted either side of said weighted catch member on the support member to normally retain said weighted catch member in engagement with the headed member.

CHARLES HILLYARD NICHOLS.